June 8, 1965   L. W. JOHNSON ETAL   3,187,419
ARMATURE WEDGER

Filed Dec. 26, 1961   7 Sheets-Sheet 7

INVENTORS
LOGAN W. JOHNSON
MELVIN J. STRAUB
THOMAS L. SCHUETTE
By Moore, Whitebird
ATTORNEYS

United States Patent Office 3,187,419
Patented June 8, 1965

3,187,419
ARMATURE WEDGER
Logan W. Johnson, Minneapolis, Melvin J. Straub, Hopkins, and Thomas L. Schuette, Minneapolis, Minn., assignors, by mesne assignments, to Avnet, Inc., Chicago, Ill., a corporation of New York
Filed Dec. 26, 1961, Ser. No. 161,985
11 Claims. (Cl. 29—205)

This invention is directed to a machine for inserting the second side of preformed coils into armatures and the securing wedges therefor. It incorporates a novel jaw feature for aligning, with a slot in the armature, the terminal side of a preformed coil one portion of which has already been inserted therein and for simultaneously inserting the coil side and its wedging tube into the armature through the coil guiding jaws. It is further novel in providing structure that adapts the machine to inserting coils and wedges in armatures of widely varying sizes which is accomplished by aligning the bottom of the armature with the bottom of the coil and wedge guiding jaws whereby the wedges are always properly aligned with the armature. Further novel structure includes the wedge handling structure and the wedging blade linkage which places the coil and wedge in the armature slots and secures them there by a slight additional application of force to the blade lever.

Accordingly it is the principal object of this invention to provide a novel armature wedger machine.

It is a further object of this invention to provide an armature coil and wedging machine that will adapt itself readily to a wide variety of armatures.

It is a further object of this invention to provide an armature wedger, the coil and wedge positioning jaws of which are actuated in synchronism with the inserting blade.

Yet another object of this invention is to provide a coil inserting and wedging machine which simultaneously inserts a terminal side of a performed coil into an armature and wedges it against accidental displacement.

It is yet another object of this invention to provide an armature coil inserting and wedging machine into which and from which armatures can be rapidly and accurately inserted and removed.

Yet another object of this invention is to provide an armature coil inserting and wedging machine that is simple and positive in action.

It is a further object of this invention to provide an armature coil inserting and wedging machine to positively position the coil side and drive the wedge into the armature slot behind the coil to secure it.

Still a further object of this invention is to provide a wedger that distorts the wedge with the final thrust of the inserting blade.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which.

Figure 1:
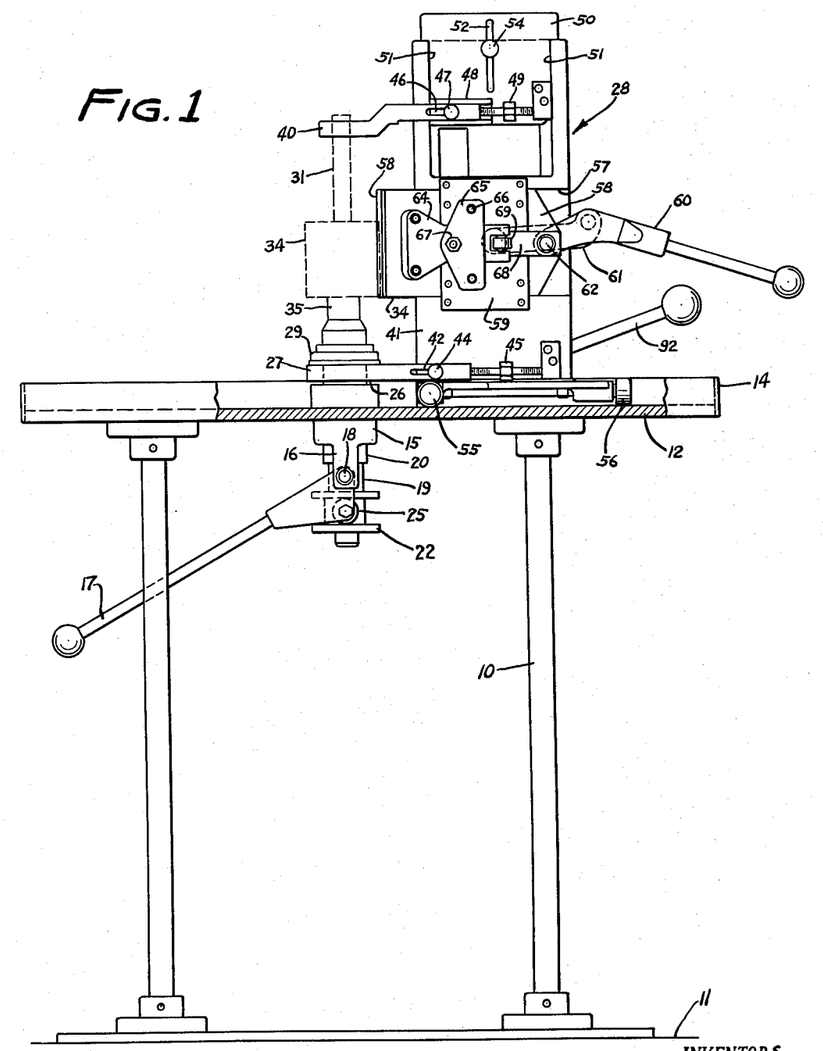
FIGURE 1 is a side elevational view of the machine with portions broken away to illustrate its construction more fully; broken lines illustrate hidden parts and the armature being worked upon.

Referring first to FIGURE 1 of the drawings, a stand 10 is provided to support the mechanism at a suitable height above a supporting surface 11. A work table 12 is secured to the stand and the work table is provided with a rim 14 surrounding the table and insuring that the coil and wedge inserter head does not slip off of work table 12.

Near the center of work table 12, a hollow supporting element 15 is positioned and provided with the ears 16 to which the lever handle 17 is pivoted suitably as at 18. A collet pulling member 19 is slidably mounted in bearing member 20 that is rigidly secured to work table 12 in a suitable manner such as the cap screw 21 in FIGURE 2. A double flange collar 22 is adjustably secured to collet puller 19 as by the threads 24 in FIGURE 2. By rotating the double flanged collar 22, it may be moved up and down on the end of collet puller 19; the internal threads in the collar interacting with threads 24.

Figure 2:
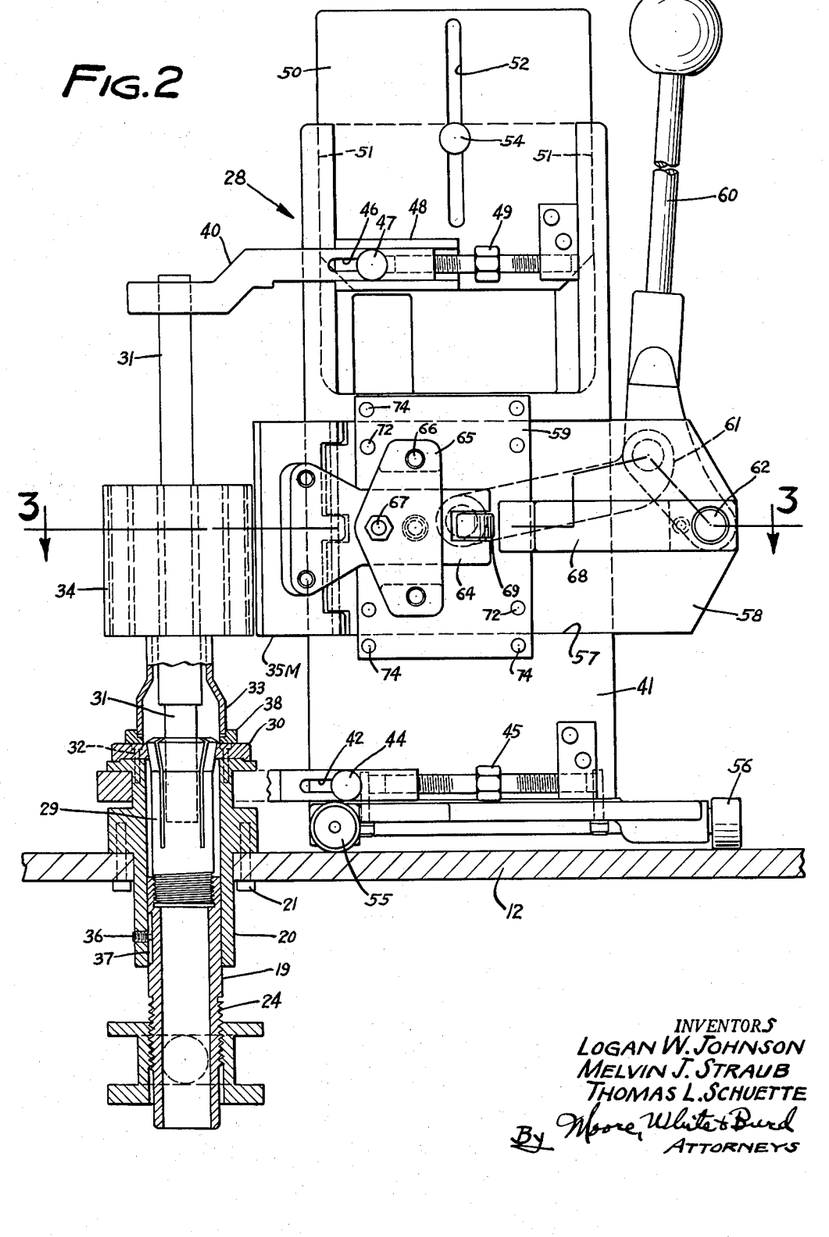
FIGURE 2 is a fragmentary view drawn to an enlarged scale of the principal working portions of the machine as shown in FIGURE 1 with the machine adjusted to a different position in its cycle of operation; still further portions of the machine are broken away to illustrate internal construction and hidden parts are illustrated with broken lines.

Lever handle 17 is provided with followers 25 which are captured between the flanges of double flange collar 22. When lever handle 17 is raised up, the collar follower 25 is moved in an upward direction pivoting on pivot 18 with the result that the collet puller 19 is moved upwardly. Moving the lever handle 17 down causes the collar followers 25 to assume a position approximately directly below 18; the lowest reach it has. In this position, lever 17 should pull collet puller 19 down so that collet 29 engages the collet wedging plate 30 with sufficient force for the collet to grip well armature shaft 31. Actually, followers 25 are allowed to move just over center to produce a toggle locking action. The appropriate adjustment is obtained by turning double flanged collar 22 on threads 24 until collet 29 applies a secure grip to the armature shaft when handle 17 is down.

Collet puller bearing 20 extends above the work table 12 and has a groove formed therein as at 26 which receives hook 27 from the inserting head 28. Collet wedging plate 30 is secured to the top of the collet support bearing member 20 in any suitable manner as by the cap screws 32 shown in broken lines in FIGURE 2.

A spacer cone 33 rests on top of wedging plate 30 and serves to position the laminated body portion 34 of the armature with its lower end exactly even with the bottom of jaws 35.

A suitable means such as set screw 36 which engages a millet slot 37 holds the collet puller 19 within the collet bearing member 20.

A suitable spacer as shown at 38 in FIGURE 2 always is placed under the cone 33. Proper adjustment of the armature core body 34 to be level with jaws 35 may be accomplished by adding spacers such as the ones shown at 39 in FIGURE 2.

The inserter mechanism 28 is oriented correctly with respect to an armature gripped in collet 29 by hook 27 engaging the slot 26 of the collet and puller bearing 20 and a similar hook 40 which engages the upper end of the shaft 31 of the armature 34. Both hook 27 and hook 40 are slidably secured to the main frame 41 of inserter 28 as by the slot 42 in hook 27 which is engaged by the positioning set screw 44. When set screw 44 is loosened, turnbuckle 45 may be adjusted until the hook 27 allows the proper distance between jaws 35 and the armature core 34. After set screw 44 is secured, hook 27 has its position determined.

A similar structure is provided with respect to hook 40 with slot 46 and set screw 47. A pair of guide rails 48 and 49 also aid in guiding the hook 40. With set screw 47 loosened, the turnbuckle 49 may be adjusted until hook 40 is also applying light tension on the upper end of armature shaft 31. In this manner the inserter head frame 41 is secured against forces tending to move it away from the armature 34.

Hook 40 is secured to plate 50. Plate 50 is in turn slidably mounted in the tracks 51 of main frame 41. At the back of main frame 41, the area occupied by plate 50 is solid and a slot 52 in plate 50 receives set screw 54 which is threaded into the back of frame 41. The end of the set screw is shown in broken lines in FIGURE 5. By loosening set screw 54, the hook 40 may be adjusted vertically to accommodate itself correctly for the shaft 31 of the armature 34 being worked upon by the inserter 28.

Main frame 41 of inserter 28 is movably mounted on the work table 12 by suitable means such as the wheels 55 which are oriented for radial movement with respect to the armature and wheels 56 are oriented for angular movement of the frame 41 relative to the collet structure.

Main frame 41 has a channel therein 57 within which is slidably arranged the insertion blade 58 held therein by plate 59. An actuating lever 60 is pivotally secured to the toggle link 61 and also by suitable means such as pin 62 to the insertion blade 58. When the actuating handle 60 is moved to a lowered position as shown in FIGURE 1, insertion blade 58 is moved forward. The reverse movement of lever 60 withdraws the insertion blade.

Figure 3:
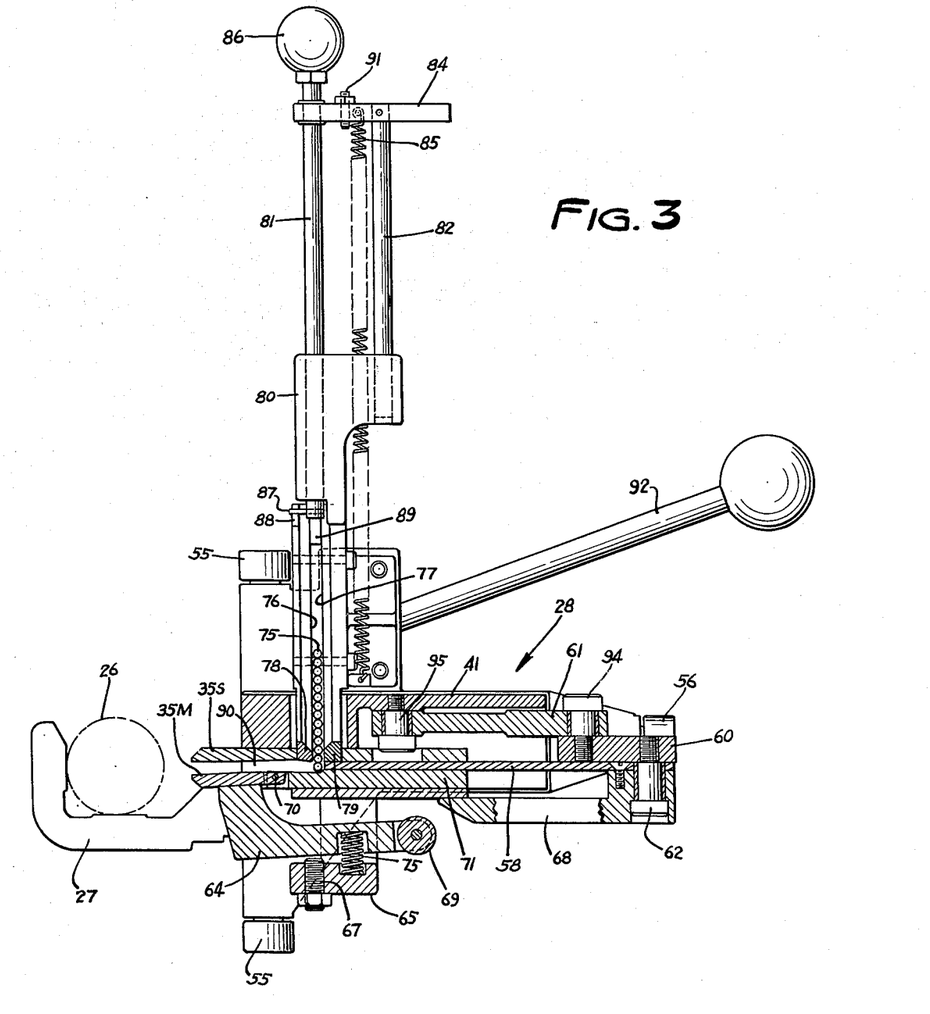
FIGURE 3 is a horizontal sectional view taken on the line and in the direction of the arrows 3—3 in FIGURE 2; it is drawn to the same scale as FIGURE 2 and broken lines illustrate hidden parts.
Figures 6, 7:
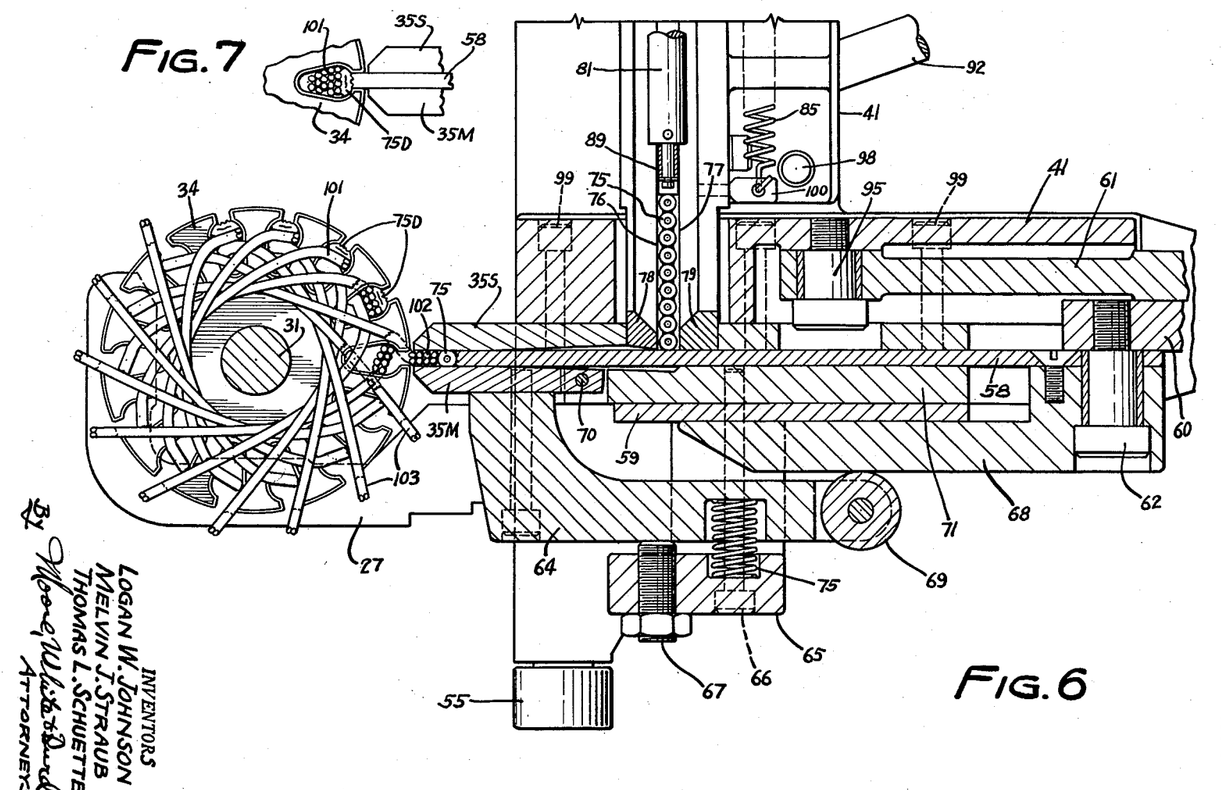
FIGURE 6 is a still further enlarged and more fragmentary disclosure of the structure shown in FIGURE 3 and with the drawing oriented at 90 degrees to the disclosure in FIGURE 3 an armature with portions of the coils broken away, portions of the coils are also illustrated to show how the machine functions; broken lines illustrate hidden parts.
FIGURE 7 is a fragmentary view of the armature coil insulation wedge and wedge driver shown in the finishing position to illustrate how the wedge is deformed in the armature slot.

One of jaws 35 is a movable jaw identified in FIGURES 3 and 6 as jaw 35M and the other is a stationary jaw identified as 35S. Movable jaw 35M (which is the one within view in FIGURE 1) has secured to it a leverage mechanism 64 which is pivotally supported by being secured to jaw 36M. A bridge 65 is secured to frame 41 suitably as by the screws 66 extending through plate 59 and anchored in the stationary portion of the machine. Set screw and jam nut 67 are supported in bridge 65 and provide a final adjustable fulcrum about which the actuating lever 64 may pivot as it applies final moving force to jaw 35M.

A wedge member 68 is secured to the insertion blade 58 and it activates the leverage member 64 when the wedge engages the roller follower 69 that is supported in the bifurcated end of leverage member 64. Thus, when lever 60 is moved to the position shown in FIGURE 1, it not only advances the insertion blade but also causes the movable jaw 36M to approach the stationary jaw 36S a predetermined distance.

Movable jaw 35M is pivotally supported as at 70 in relation to the combination support and bearing block 71. This block appears clearly in section in FIGURES 3 and 6 and is supported by being secured to plate 69 as by the screws 72 seen in FIGURE 2. Screws 74 in plate 59 secure the plate to the frame 41. A spring as seen in FIGURES 3 and 6 at 75 opens movable jaw 35M whenever the wedge member 68 is withdrawn along with the insertion blade.

The final portion of the mechanism is the wedge holding and feeding magazine. As seen clearly in FIGURES 3 and 6, the wedges 75 are supported in an in line manner between the side plates 76 and 77 of the wedge magazine. The magazine side plates terminate in the feed plates 78 and 79. The wedge feeding mechanism is also seen clearly in FIGURE 3 which consists of the bearing member 80 which slidably supports the magazine rod 81 and its parallel guide rod 82. These two rods are secured together at their outboard ends in a suitable manner as by being scured to plate 84. A resilient means, such as spring 85, constantly urges the magazine rod and guide rod toward the feed plates 78 and 79. In the position shown in FIGURE 3, the magazine rod and its guide rod have been withdrawn by means of force applied to knob 86.

Figure 4:
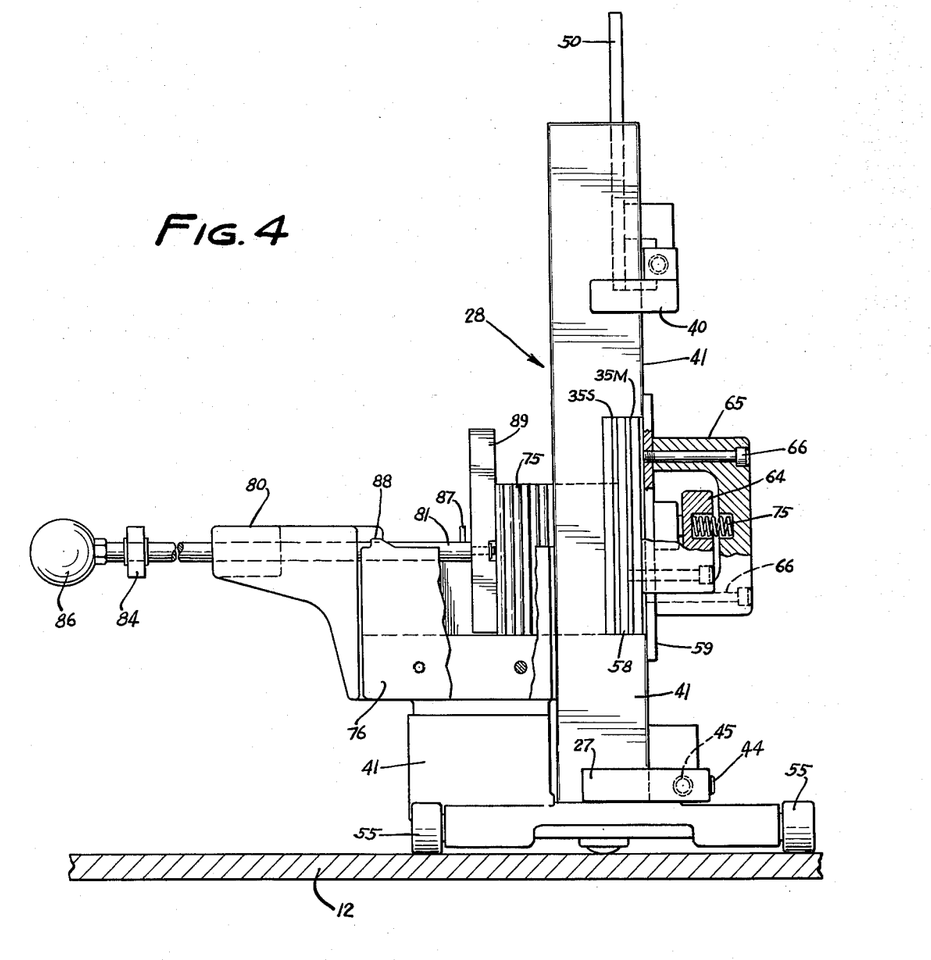
FIGURE 4 is a top plan view taken on the line and in the direction of the arrows 4—4 of FIGURE 3.

Magazine rod 81 is rotatably supported in plate 84 and has near its end farthest from knob 86 the radially extending lug 87. As shown in FIGURE 3, this lug has been deposited behind stop 88 by a 90 degree rotation of the magazine rod 81. In this position, the magazine rod is held in a withdrawn position so that no pressure is applied to wedges 75. In FIGURE 4, however, the lug 87 has been rotated 90 degrees and thereby released from behind stop 88. In this position, the spring 85 is allowed to urge the magazine rod and its guide rod 81 and 82 respectively toward the jaw structure and thereby apply an urging force to the wedges 75 in the magazine.

A wedge driving plate 89 is secured pivotally to the inside end of the magazine rod or shaft 81. FIGURE 3 is an illustration of the condition in which the magazine shaft is placed and held while the magazine is being filled with wedges and FIGURE 4 illustrates the operative position of the machine when wedges are being urged through the magazine and into the discharge channel 90 formed by the inside faces of the jaws 35.

Bearing support 80 is rigidly secured to frame 41 as are the members 76–77 forming the magazine. Plate 84 also carries a jam nut and set screw assembly 91 which serves to limit the inward thrust of the magazine shaft 81. The inner end of set screw 91 engages the outer face of bearing member 80 to positively stop the wedge pusher blade 89 to prevent this blade from extending into the path of insertion blade 58.

A handle as seen at 92 in FIGURE 3 is rigidly secured to the base of frame 41 and serves as a convenient means for pivoting the entire insertion head 28 about an armature mounted in the work table 12.

FIGURE 3 also shows clearly the shouldered cap screw 94 which secures pivotally the link 61 to actuating handle 60. Also clearly visible in this figure, is a similar shouldered cap screw 95 which secures pivotally the link to frame 41.

Figure 5:
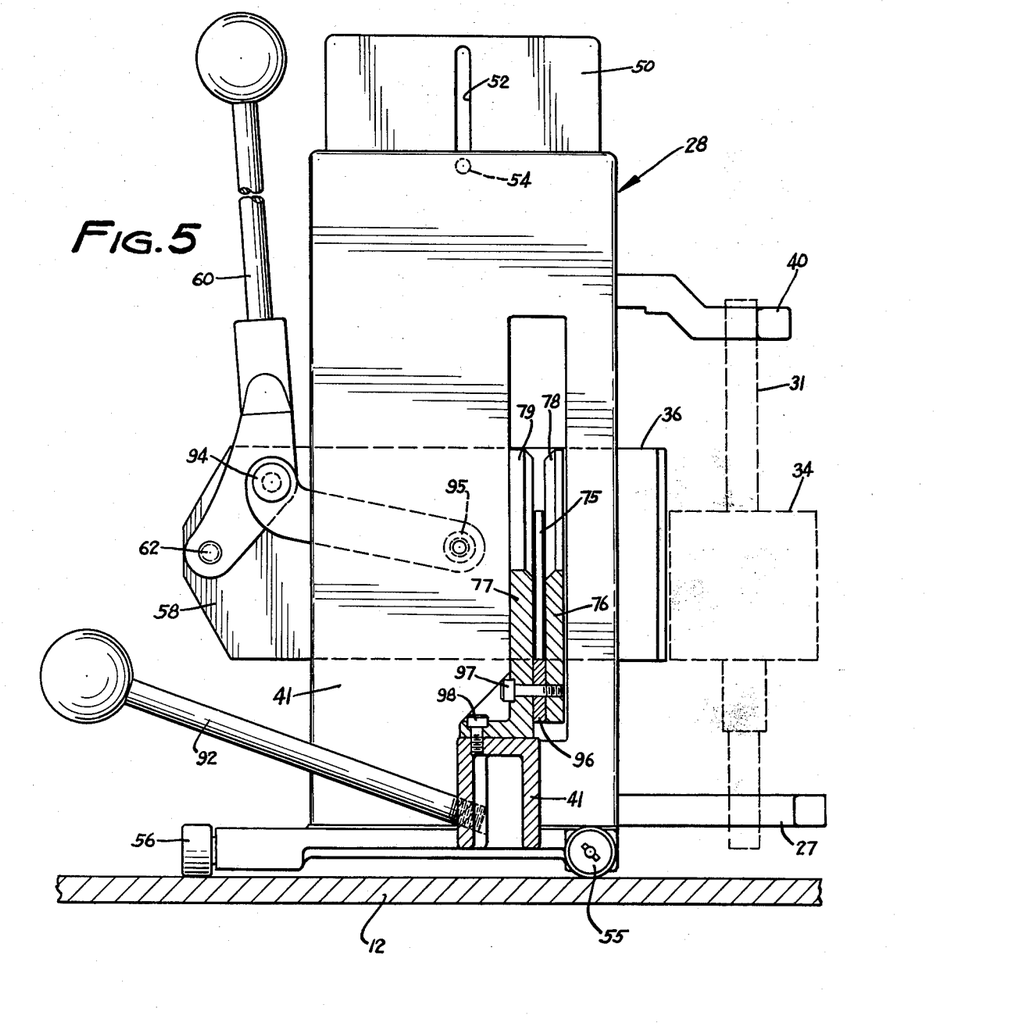
FIGURE 5 is a side elevation of the machine as shown in FIGURE 4 only viewed from the side opposite to that shown in FIGURE 2 with broken lines illustrating hidden parts; portions of the device are broken away to illustrate construction more fully.

In FIGURE 5, the attaching structure of the magazine is seen even more clearly where the magazine side plates 76–77 are shown held apart by spacer bottom plate 96. Suitable means such as screws 97 secure the three plates together. Side plate 77 is seen to take the form of an L-member which is suitably secured to frame 41 as by the screws 98.

In FIGURE 6, some additional details are shown and as for example the cap screws 99 which secure the stationary jaw 36S to frame 41. Also clearly shown in this figure is the pierced pin 100 which serves as an anchor point on frame 41 for the spring 85 of the magazine. In FIGURES 6 and 7 there is also shown the coil sides 101 which have been wedged as by the deformed wedges 75D and a coil side 102 being gripped by the jaws 35 preparatory to being inserted into the slot of armature 34. At 103 in FIGURE 6 may be seen coil sides that have not yet been inserted.

Figures 8, 9, 10, 11, 12, 13:
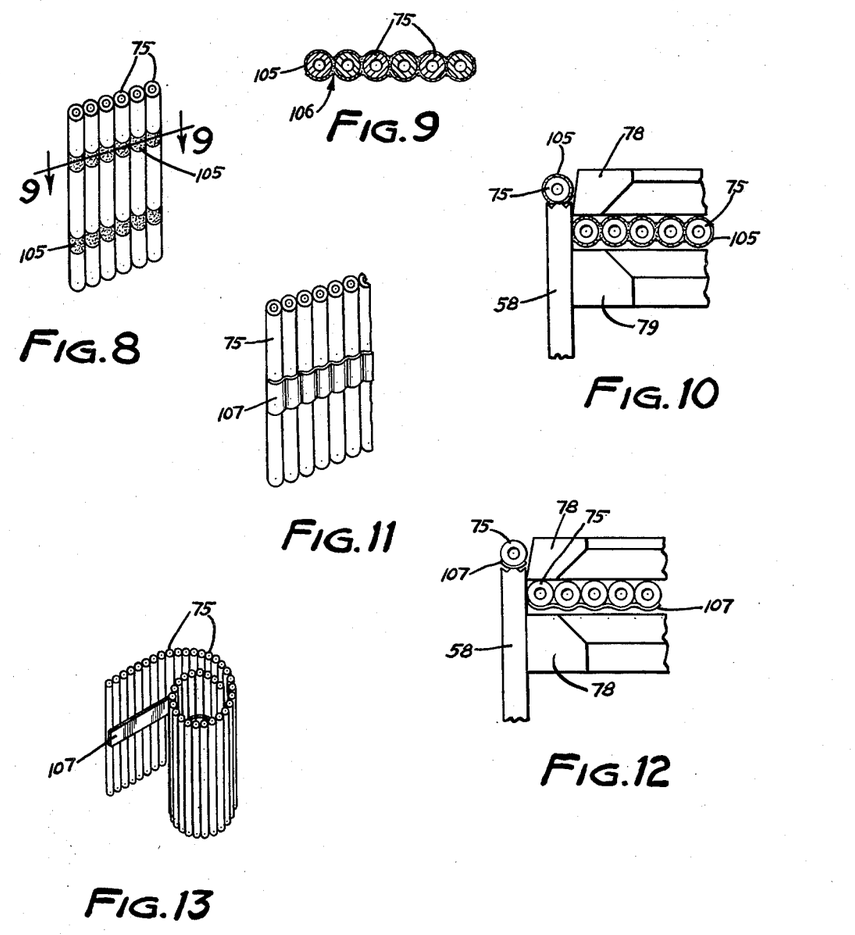
FIGURE 8 is an isometric view of a series of wedges secured together by glue and drawn to the scale of FIGURE 6.
FIGURE 9 is a sectional view of the wedges of FIGURE 8 taken on the line and in the direction of the arrows 9—9 of that figure; it is drawn to a larger scale than FIGURE 8.
FIGURE 10 is a view drawn to the same scale as FIGURE 9 and showing a fragment of the magazine structure and pusher blade illustrating how a glued wedge is severed from the magazine load group.
FIGURE 11 is an isometric view drawn to the same scale as and similar to that shown in FIGURE 8, except illustrating how tape is used to hold groups of wedges together rather than glue.
FIGURE 12 is a view similar to FIGURE 10 except that taped rather than glued wedges are illustrated.
FIGURE 13 is an isometric view drawn to a smaller scale than FIGURES 8 through 11, showing how the taped wedges may be rolled for storage.

In FIGURE 8 the wedges 75 are shown secured together by the bands of glue 105 which are applied as the wedges are arranged in line formation. The wedges are passed between rollers which apply a band of glue, sometimes called tack gluing, all the way around each of the wedges. These bands fuse together between the wedges and form connecting links as at 106 in FIGURE 9.

In FIGURE 10, the wedges 75 that are glued together as shown in FIGURE 9 are shown being separated by the driving blade 58, as they extend between the feed plates 78 and 79. When the wedges are thus glued together, they are separated simply by breaking the glue bond between the single wedge being driven and a group of wedges still in the magazine.

In FIGURE 11 a modified form of the magazine load is shown as being a series of wedges 75 held together by a tape 107. Any suitable tape may be employed and a readily frangible one such as acetate backed pressure sensitive tape has been found to be suitable. This tape is applied from a roll as the wedges are aligned in a single file and passed between a pair of pressing rollers.

When the gluing technique is used, the number of wedges secured together is normally limited to the number that will be used in a single load of the magazine or in multiples of such number. When the wedges are held together by tape 107, however, it is entirely practical to run a large number of wedges together on a single tape and then coil them as shown in FIGURE 13 for shipment or storage. When it is desired to load a magazine the number of wedges to be placed in the magazine is simply counted off and the tape separated as by a sharp blade.

In FIGURE 12 the separation of a taped wedge from the group is illustrated. In that figure, the driving blade 58 is shown forcing a wedge 75 past the feed plate 78 after having severed the tape 107. It will be noticed that the tape is wrapped slightly around the last wedge 75 in the magazine. This is true because the tape is on the back side of the wedges with respect to the armature being wedged.

Because of the tendency of the severed tape end to follow along with the blade, it is important that the tape be placed with its non-adhesive surface facing the blade. If the wedges were placed in the magazine in a reverse manner to that illustrated in FIGURE 12, the tape would tend to trail the side of blade 58 with the result that it would probably become gummed up and hard to operate and conceivably inoperable. When the non-adhesive side of the tape faces blade 58, however, the end of the tape, as it is broken in advancing one of the wedges, simply wraps around the then last wedge remaining in the magazine as clearly shown in FIGURE 12, operation has been found to be very smooth and satisfactory.

*Operation of the machine*

In operating the machine, the first step is to adjust correctly the collet pulling means so that when the armature shaft 31 is engaged by the collet and tightened by lowering lever 17, the armature will be tightly gripped. At the same time, the proper spacer cone 33 should be placed under the armature so that the bottom of the armature will exactly align with the bottom of the jaws 35. Once these adjustments have been properly made, an armature is tightly clamped in the collet.

The hook 40 should next be properly adjusted vertically by loosening set screw 54 and sliding plate 52 up or down in the rails 51 until hook 40 is at a level relative to the armature shaft 31 as near to the armature body 34 as is possible without interfering with the placement of the coils. Once the vertical adjustment of hook 40 has been determined, the lateral adjustment is made on both hook 40 and hook 27 in the following manner.

First, the set screws 44 for the hook 27 and set screws 47 for hook 40 are loosened until the hooks are free and movable. The hexagon turnbuckles 45 and 49 are then loosened until there is sufficient clearance between the jaws 35 and armature body 34 to allow easy rotation of the inserter head about the armature. Then, with the hooks engaged with the bearing 20 for hook 27 and the armature shaft 31 for hook 40 respectively, the turnbuckles 45 are tightened until a .005 feeler gauge is, with slight resistance, movable between the jaws and the armature. When this adjustment has been secured properly, the set screws 44 and 47 are tightened to fix this adjustment.

Once the armature core and wedging inserted head have been properly located with respect to each other, the armature is loaded with coils such as those 101–103 in FIGURE 6 and the coils turned slightly to hold them in position. When each slot in the armature is provided with one side of one coil, the entire group is turned by hand in a clockwise direction, which will bring the free sides of the coils to a starting position.

The magazine is then loaded by withdrawing magazine rod 81 and turning it 90 degrees by means of the knob 86 until the lug 87 is behind stop 88. The magazine is then free to be loaded with wedges 75. After an appropriate number of wedges have been applied to wedge an armature such as the one being worked on, handle 86 is released and the wedge pusher plate 89 engages the wedges 75 and forces one into the chamber at the inner end of channel 90 behind jaws 35.

The next step is, by means of lever handle 91, to maneuver the inserter head until one of the free coil sides 103 is placed between the jaws 35. Then handle 92 is again used to maneuver the inserter head 28 until the coil side 102 is opposite a coil slot. The machine will more or less discover its own position relative to the armature. Then, visually observing the jaws in relation to the armature to make sure there is no displacement, begin pulling down handle 60 which will force the coil side and wedge into an armature slot. As the entire assembly is forced into the slot, the handle 60 is given one fianl short jarring stroke which spreads the wedge 75D as shown in FIGURE 7.

If jaws 35 seem to grip the wire coil 102 and the wedge 75 more tightly than is desirable, pressure may be released somewhat by backing off on the fulcrum set screw 67. Contrariwise, if the pressure seems to be too little and allows some slack in the wire coil side rather than guiding it straight into the slot, the fulcrum set screw 67 should be tightened slightly in order to increase pressure on the jaws.

The coils are thus inserted and the wedges spread behind each coil side proceeding to move the wedging head 28 around the fixed armature on table 12. Wheel 56 being substantially spaced from the armature, is oriented for this angular motion around the armature while the wheels 55 are so close to the armature that very little movement of them is necessary.

When the last coil has been inserted and wedged, the collet is released and the armature removed.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. An armature wedger adapted to drive wedges and having a supported work table, means on said work table for gripping and holding an armature vertically with respect thereto, a wedger head having a frame supported by said work table, hook means secured to said frame for engaging said means and to hold said wedger head from withdrawing farther than a limited distance from the armature, a pair of openable and closeable jaws secured to said frame, a wedge channel behind said jaws, a wedge magazine feeding into said wedge channel, a wedge driving blade reciprocable in said channel and between said jaws, means pivoted to said frame and said wedge driving blade for reciprocating it, said means simultaneously closing said jaws when said wedge driving blade is moved in one direction and for releasing them when said wedge driving blade is moved in the other direction.

2. The structure of claim 1 in which said jaws comprise a fixed jaw and a movable jaw, a resilient means engaging said frame and movable jaw urging it open, a cam on said wedge driving blade and a cam follower on said movable jaw, said cam engaging said cam follower when said wedge driving blade is advanced.

3. The structure of claim 2 in which a bridge is secured to said frame and extends across said movable jaw, and an adjustable fulcrum secured to said bridge and reacting with said movable jaw near the end of its closing motion.

4. The structure of claim 1 n which said magazine comprises a pair of side plates, a pusher plate slidably mounted between said side plates, a magazine rod slidably secured to said frame and pivotally secured to said pusher plate, a spring secured to said magazine rod and frame urging said magazine rod toward said channel, a stop means on said frame spaced from said channel, and a lug on said magazine rod engageable with said stop means when said magazine rod is withdrawn against the urging of said spring and pivoted.

5. The structure of claim 4 in which said magazine rod has a stop adjustably secured thereto, said stop engaging said frame to prevent entry of said wedge pusher plate into said channel.

6. An armature wedger having a work table, a support member near the center of said work table, a collet in said support member for gripping and holding an armature shaft vertically with respect to said work table, a wedger head having a frame supported by said work table, hook means movably secured to said frame for engaging said support member and an armature, means for alternately moving and fixing said hook means, said hook means when fixed holding said wedger head from withdrawing farther than a limited distance from an armature in said collet, a pair of jaws secured to said frame, a channel behind and aligned with said jaws, a wedge driving blade slidable to and fro in said channel, a wedge feeding means communicating with said channel, and means mounted on said frame for alternately advancing said wedge driving blade and simultaneously closing said jaws and withdrawing said wedge driving blade and releasing said jaws.

7. The structure of claim 6 in which said hook means are slotted, set screws extending through the slots of said hook means and into said frame, and turnbuckles engaging said frame at one end and said hook means at the other.

8. The structure of claim 6 in which said frame has wheels engaging said work table, some of said wheels being oriented for radial movement of said frame relative to said support member and others of said wheels being oriented for angular movement about said support member.

9. The structure of claim 6 in which means are provided for spacing an armature core with its bottom side exactly aligning with the bottom of said jaws.

10. An armature wedger having a frame, a work table secured to said frame, means near the center of said work table for gripping and holding an armature vertically with respect thereto, a wedger head having a frame freely movable on the surface of said work table, wedge feeding means on said frame, wedge guiding means on said frame, wedge driving means on said frame, and hooks secured to said frame and extending in front of said wedge guiding means, said hooks being selectively movable and fixed in relation to said frame, said hooks engaging said means near the center of said work table and a portion of an armature gripped thereby to establish a pivoting relationship between an armature fixed in said means near the center of said work table and said wedger head.

11. The structure of claim 10 in which said hooks are slotted, set screws extending through the slots in said hooks and into said frame, and turnbuckles engaging said frame at one end and said hooks at the other.

References Cited by the Examiner
UNITED STATES PATENTS

| | | | |
|---|---|---|---|
| 2,142,194 | 1/39 | Karfiol. | |
| 2,192,801 | 3/40 | Poole | 29—205 |
| 2,685,730 | 8/54 | Probst | 29—205 |
| 2,769,533 | 11/56 | Booth. | |

WHITMORE A. WILTZ, *Primary Examiner.*

THOMAS H. EAGER, *Examiner.*